US009869926B2

(12) United States Patent
Takagi et al.

(10) Patent No.: US 9,869,926 B2
(45) Date of Patent: Jan. 16, 2018

(54) WAVELENGTH CONVERSION ELEMENT, LIGHT SOURCE DEVICE, AND PROJECTOR

(71) Applicant: SEIKO EPSON CORPORATION, Tokyo (JP)

(72) Inventors: Kunihiko Takagi, Okaya (JP); Tetsuo Shimizu, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/419,275

(22) Filed: Jan. 30, 2017

(65) Prior Publication Data

US 2017/0227836 A1    Aug. 10, 2017

(30) Foreign Application Priority Data

Feb. 5, 2016   (JP) .................................. 2016-020587
Jul. 21, 2016  (JP) .................................. 2016-143503

(51) Int. Cl.
| *G03B 21/20* | (2006.01) |
| *G02B 27/14* | (2006.01) |
| *F21V 13/14* | (2006.01) |
| *G03B 21/00* | (2006.01) |

(52) U.S. Cl.
CPC ............ *G03B 21/204* (2013.01); *F21V 13/14* (2013.01); *G02B 27/141* (2013.01); *G03B 21/005* (2013.01); *G03B 21/2066* (2013.01)

(58) Field of Classification Search
CPC .... G03B 21/005; G03B 21/28; G03B 21/204; G03B 21/208; G03B 21/2013; G03B 21/2066; G02B 19/0014; G02B 19/0028; G02B 19/0066; G02B 27/14; G02B 27/141

See application file for complete search history.

(56) References Cited

U.S. PATENT DOCUMENTS

| 2013/0270587 A1* | 10/2013 | Ouderkirk ............... H01L 33/60 257/89 |
| 2014/0176915 A1* | 6/2014 | Yamamoto ............... H04N 9/31 353/31 |

FOREIGN PATENT DOCUMENTS

| JP | 2010-086815 A | 4/2010 |
| JP | 2012-169049 A | 9/2012 |

* cited by examiner

*Primary Examiner* — Sultan Chowdhury
(74) *Attorney, Agent, or Firm* — Oliff PLC

(57) ABSTRACT

A wavelength conversion element includes: a wavelength conversion layer; a light-transmissive member provided on a light-incident surface side of the wavelength conversion layer and including a support surface including an inclined portion inclined with respect to the light-incident surface; and a first reflection portion provided along the support surface and reflecting fluorescence light. The first reflection portion includes a dichroic film that transmits excitation light. The excitation light passes through the dichroic film and the light-incident surface in this order to enter the wavelength conversion layer. Defining a plane including the light-incident surface as a reference surface, a distance between the reference surface and the first reflection portion in a periphery region of the first reflection portion is smaller than a distance between the reference surface and the first reflection portion in a central region of the first reflection portion.

20 Claims, 6 Drawing Sheets

WAVELENGTH CONVERSION ELEMENT, LIGHT SOURCE DEVICE, AND PROJECTOR

BACKGROUND

1. Technical Field

The present invention relates to a wavelength conversion element, a light source device, and a projector.

2. Related Art

As a light source device used for a projector or the like, a light source device has been proposed which irradiates a phosphor with excitation light emitted from a light source such as a semiconductor laser and uses fluorescence light obtained from the phosphor.

For example, JP-A-2010-86815 discloses a light source device including an excitation light source, a red light-emitting device, a green light-emitting device, and a blue light-emitting device. The light-emitting devices of the respective colors each include a base material having a light-transmissive property, a dichroic layer, and a phosphor layer. Excitation light that is emitted from the excitation light source successively passes through the base material and the dichroic layer, and is then enters the phosphor layer. In fluorescence light that is emitted from the phosphor layer in all directions, fluorescence light that travels toward the base material side is reflected by the dichroic layer and extracted to the side opposite to the base material.

In the light source device disclosed in JP-A-2010-86815, the dichroic layer transmitting the excitation light and reflecting the fluorescence light is provided between the base material and the phosphor layer for extracting the fluorescence light in a desired direction, that is, to the side opposite to the base material. However, in the fluorescence light that is incident on the dichroic layer, a P-polarization component that has an incident angle close to Brewster's angle passes through the dichroic layer. Therefore, the light source device disclosed in JP-A-2010-86815 has a problem in that some components of the fluorescence light cannot be extracted in the desired direction.

SUMMARY

An advantage of some aspects of the invention is to provide a wavelength conversion element capable of increasing light that is extracted in a desired direction. Another advantage of some aspects of the invention is to provide a light source device including the wavelength conversion element. Still another advantage of some aspects of the invention is to provide a projector including the light source device.

A wavelength conversion element according to an aspect of the invention includes: a wavelength conversion layer including a light-incident surface; a light-transmissive member provided on the light-incident surface side of the wavelength conversion layer and including a support surface including an inclined portion inclined with respect to the light-incident surface; and a first reflection portion provided along the support surface and reflecting fluorescence light emitted from the wavelength conversion layer, wherein at least a portion of the first reflection portion is formed of a dichroic film that transmits excitation light for exciting the wavelength conversion layer, the light-transmissive member is disposed such that the excitation light passes through the dichroic film and the light-incident surface in this order to enter the wavelength conversion layer, and when a plane including the light-incident surface is defined as a reference surface and a gap between the reference surface and the first reflection portion in a direction perpendicular to the reference surface is defined as a distance between the reference surface and the first reflection portion, the inclined portion is inclined with respect to the light-incident surface such that a distance between the reference surface and the first reflection portion in a periphery region of the first reflection portion is smaller than a distance between the reference surface and the first reflection portion in a central region of the first reflection portion.

In the wavelength conversion element of the aspect of the invention, the first reflection portion at least a portion of which is formed of the dichroic film is provided along the support surface including the inclined portion of the light-transmissive member. Therefore, a component that is incident on the dichroic film at an incident angle close to Brewster's angle and passes through the dichroic film is less than that of a wavelength conversion element in the related art. As a result, in the fluorescence light produced by the wavelength conversion layer, a component that can be extracted in a desired direction, that is, to the side of the wavelength conversion layer opposite to the light-incident surface, is increased.

In the wavelength conversion element of the aspect of the invention, an air layer may be provided between the light-transmissive member and the light-incident surface.

According to this configuration, in the fluorescence light produced by the wavelength conversion layer, a component that is totally reflected by the light-incident surface is increased compared with the case where the air layer is not provided between the light-transmissive member and the light-incident surface. With this configuration, in the fluorescence light produced by the wavelength conversion layer, the component that can be extracted in the desired direction can be further increased.

In the wavelength conversion element of the aspect of the invention, the support surface may include a flat surface.

According to this configuration, the uniformity of optical characteristic in a region of the first reflection portion that is formed on the flat surface is higher than that in the case where the first reflection portion is provided on a curved surface.

In the wavelength conversion element of the aspect of the invention, the support surface may include a curved surface.

According to this configuration, in the fluorescence light produced by the wavelength conversion layer, the component that can be extracted in the desired direction is increased more than that of a wavelength conversion element in the related art.

In the wavelength conversion element of the aspect of the invention, the light-transmissive member may be a plano-convex lens, a flat surface of the plano-convex lens may be opposite the light-incident surface, and the flat surface may be in thermal contact with the light-incident surface.

According to this configuration, heat that is generated in the wavelength conversion layer can be released through the light-transmissive member.

In the wavelength conversion element of the aspect of the invention, a refractive index of the light-transmissive member may be substantially equal to that of a phosphor constituting the wavelength conversion layer.

According to this configuration, reflection at the interface between the wavelength conversion layer and the light-transmissive member is suppressed, and thus light loss associated with the interface reflection can be reduced.

In the wavelength conversion element of the aspect of the invention, the first reflection portion may further include a reflection surface made of a metal material, and as viewed in a direction perpendicular to the light-incident surface, the dichroic film may be provided in a region including the central region of the wavelength conversion layer and the reflection surface may be provided at least outside the dichroic film.

In general, the dichroic film has the incident angle dependence of reflectance, whereas the reflection surface made of a metal material does not have the incident angle dependence of reflectance. Therefore, if the first reflection portion is formed only of the dichroic film, the fluorescence light passes through the dichroic film depending on the incident angle and thus the efficiency in extracting the fluorescence light in the desired direction decreases. In that regard, according to the configuration, since the reflection surface made of a metal material is provided in a region where the incident angle of the fluorescence light is likely to be large, the efficiency in extracting the fluorescence light in the desired direction can be increased.

The wavelength conversion element of the aspect of the invention may further include a structure overlapping the reflection surface as viewed in the direction perpendicular to the light-incident surface, wherein the support surface may be provided on the side of the light-transmissive member opposite to the light-incident surface, and the reflection surface may be provided on the structure.

According to this configuration, since it is possible to provide the dichroic film on the light-transmissive member and provide the reflection surface made of a metal material on the structure, the optical characteristics of the dichroic film and the reflection surface can be enhanced. Moreover, a deposition process in depositing the dichroic film on a surface of the light-transmissive member on the side opposite to the light-incident surface can be simplified.

In the wavelength conversion element of the aspect of the invention, the reflection surface may be formed of a reflection film provided on the structure.

According to this configuration, it is possible, by appropriately selecting the reflection film, to obtain a reflection surface having a desired reflectance.

In the wavelength conversion element of the aspect of the invention, the support surface may be provided on the light-incident surface side of the light-transmissive member.

According to this configuration, the fluorescence light that is emitted from the wavelength conversion layer toward the dichroic film is incident on the dichroic film without passing through the light-transmissive member. With this configuration, the loss of the fluorescence light due to absorption within the light-transmissive member can be suppressed.

A light source device according to another aspect of the invention includes: the wavelength conversion element of the aspect of the invention; and an excitation light source that emits the excitation light.

According to this configuration, since the wavelength conversion element of the aspect of the invention is included, the light source device having high light-use efficiency can be provided.

The light source device of the aspect of the invention may further include: a base material including a first surface and a second surface opposite the first surface; a condensing optical system; and a second reflection portion, wherein the base material may include a hole penetrating the base material from the first surface to the second surface, the wavelength conversion layer may be provided in the hole, the light-transmissive member may be provided on the first surface side of the base material, the condensing optical system may be provided on the second surface side of the base material, and the second reflection portion may be provided between the base material and the wavelength conversion layer.

According to this configuration, it is easy to strike a balance between the distance between the light-incident surface of the wavelength conversion layer and the dichroic film and the distance between the light-exiting surface of the wavelength conversion layer and the condensing optical system. Moreover, the second reflection portion is provided between the base material and the wavelength conversion layer; therefore, in the fluorescence light produced by the wavelength conversion layer, a component that travels toward the base material is reflected by the second reflection portion. Therefore, compared with the case where the second reflection portion is not provided, a component that is absorbed by the base material and is lost is reduced. Moreover, since a component that travels within the base material is reduced, the light-transmissive member or the condensing optical system does not have to be large. Moreover, since light that is emitted from a predetermined region, that is, light that is emitted at a predetermined etendue, is increased, the amount of light to be effectively used in an optical system is increased.

In the light source device of the aspect of the invention, an outline of the light-incident surface may be located inside an outline of the dichroic film as viewed in a direction perpendicular to the plane, and the light source device may further include a third reflection portion reflecting a component of the fluorescence light toward the dichroic film, the component having been reflected by the dichroic film and traveling toward a region outside the light-incident surface.

According to this configuration, since the component of the fluorescence light, which component is reflected by the dichroic film and travels toward the region outside the light-incident surface, can be reflected again by the dichroic film, the proportion of a component that is lost can be made smaller.

A projector according to another aspect of the invention includes: the light source device of the aspect of the invention; a light modulator that modulates, in accordance with image information, light emitted from the light source device to produce image light; and a projection optical system that projects the image light.

Since the projector of the aspect of the invention includes the light source device of the aspect of the invention, the projector having high light-use efficiency can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
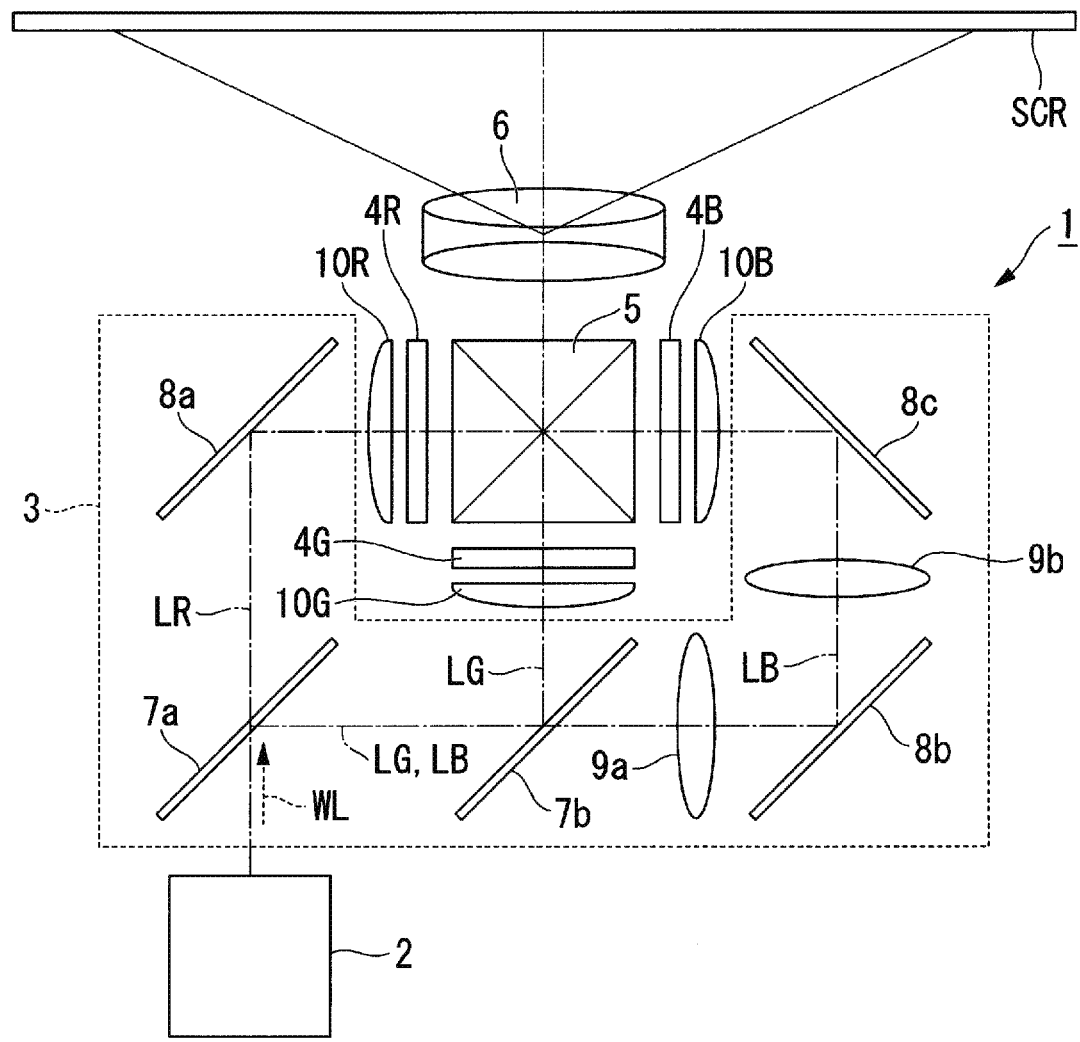
FIG. 1 is a schematic configuration diagram of a projector of a first embodiment of the invention.

Hereinafter, a first embodiment of the invention will be described in detail with reference to FIGS. 1 to 4.

In the drawings used in the following description, a characteristic portion may be shown in an enlarged manner, for convenience sake, to facilitate understanding thereof, and thus the dimension ratio and the like of each component are not always the same as actual ones.

Projector

A projector of the embodiment is an exemplary projector using three transmissive liquid crystal light valves.

Figure 2:
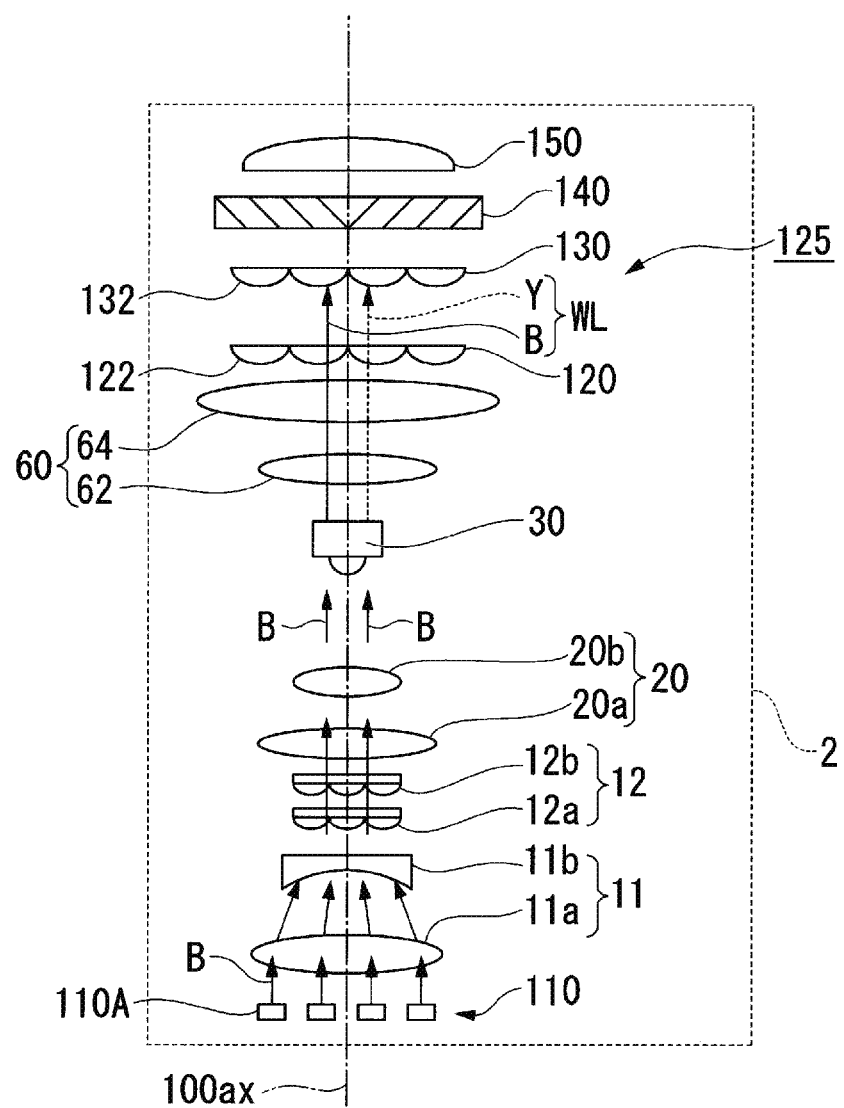
FIG. 2 is a schematic configuration diagram of a light source device of the first embodiment of the invention.

FIG. 1 is a schematic configuration diagram showing the projector of the embodiment. FIG. 2 is a schematic configuration diagram showing a light source device of the embodiment.

As shown in FIG. 1, the projector 1 includes the light source device 2, a color separation optical system 3, a light modulator 4R, a light modulator 4G, a light modulator 4B, a light combining optical system 5, and a projection optical system 6. The light source device 2 emits illumination light WL. The color separation optical system 3 separates the illumination light WL from the light source device 2 into red light LR, green light LG, and blue light LB. The light modulator 4R, the light modulator 4G, and the light modulator 4B respectively modulate the red light LR, the green light LG, and the blue light LB in accordance with image information, and form image lights of the respective colors. The light combining optical system 5 combines the image lights of the respective colors from the light modulators 4R, 4G, and 4B. The projection optical system 6 projects the combined image light from the light combining optical system 5 onto a screen SCR.

The light source device 2 emits the illumination light (white light) WL of a white color obtained by combining portion of blue excitation light that is emitted from a semiconductor laser with yellow fluorescence light that is produced by a phosphor through wavelength-conversion of the excitation light. The portion of the blue excitation light is emitted without being wavelength-converted. The light source device 2 emits the illumination light WL adjusted so as to have a substantially uniform illuminance distribution toward the color separation optical system 3. A specific configuration of the light source device 2 will be described later.

The color separation optical system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a separates the illumination light WL emitted from the light source device 2 into the red light LR and mixed light including the green light LG and the blue light LB. Therefore, the first dichroic mirror 7a has the characteristic of transmitting the red light LR while reflecting the green light LG and the blue light LB. The second dichroic mirror 7b separates the mixed light including the green light LG and the blue light LB into the green light LG and the blue light LB. Therefore, the second dichroic mirror 7b has the characteristic of reflecting the green light LG while transmitting the blue light LB.

The first reflection mirror 8a is disposed on the optical path of the red light LR, and reflects the red light LR transmitted through the first dichroic mirror 7a toward the light modulator 4R. The second reflection mirror 8b and the third reflection mirror 8c are disposed on the optical path of the blue light LB, and directs the blue light LB transmitted through the second dichroic mirror 7b toward the light modulator 4B. The second dichroic mirror 7b reflects the green light LG toward the light modulator 4G.

The first relay lens 9a and the second relay lens 9b are disposed at the rear stage of the second dichroic mirror 7b on the optical path of the blue light LB. The first relay lens 9a and the second relay lens 9b compensate for light loss of the blue light LB due to the fact that the optical path length of the blue light LB is longer than the optical path length of the red light LR or the green light LG.

Each of the light modulator 4R, the light modulator 4G, and the light modulator 4B is formed of a liquid crystal panel. The light modulator 4R, the light modulator 4G, and the light modulator 4B respectively modulate the red light LR, the green light LG, and the blue light LB in accordance with image information while respectively transmitting the red light LR, the green light LG, and the blue light LB, and form image lights corresponding to the respective colors. Polarizers (not shown) are disposed on the light-incident and light-exiting sides of each of the light modulator 4R, the light modulator 4G, and the light modulator 4B.

A field lens 10R, a field lens 10G, and a field lens 10B respectively collimating the red light LR, the green light LG, and the blue light LB to be respectively incident on the light modulator 4R, the light modulator 4G, and the light modulator 4B are provided on the light-incident sides of the light modulator 4R, the light modulator 4G, and the light modulator 4B.

The light combining optical system 5 is formed of a cross dichroic prism. The light combining optical system 5 combines the image lights of the respective colors from the light modulator 4R, the light modulator 4G, and the light modulator 4B, and emits the combined image light toward the projection optical system 6.

The projection optical system 6 is formed of a projection lens group. The projection optical system 6 enlarges and projects the image light combined by the light combining optical system 5 onto the screen SCR. With this configuration, an enlarged color video (image) is displayed on the screen SCR.

Light Source Device

Next, the light source device 2 of the embodiment will be described.

FIG. 2 is a diagram showing a schematic configuration of the light source device 2.

As shown in FIG. 2, the light source device 2 includes an excitation light source 110, an afocal optical system 11, a homogenizer optical system 12, a first condensing optical system 20, a wavelength conversion element 30, a second condensing optical system 60, an integrator optical system 125, and a polarization conversion element 140.

The excitation light source 110 is formed of a plurality of semiconductor lasers 110A each of which emits blue excitation light B composed of laser light. The emission intensity peak of the excitation light B is at, for example, 445 nm. The plurality of semiconductor lasers 110A are disposed in an array in one plane orthogonal to an illumination optical axis 100ax. As the excitation light source 110, semiconductor lasers that emit blue light at a wavelength of other than 445 nm, for example, 455 nm or 460 nm can also be used.

The afocal optical system 11 includes, for example, a convex lens 11a and a concave lens 11b. The afocal optical system 11 reduces the diameter of a luminous flux composed of the plurality of laser lights emitted from the excitation light source 110. A collimator optical system may be disposed between the afocal optical system 11 and the excitation light source 110 to convert the excitation light to be incident on the afocal optical system 11 to a parallel luminous flux.

The homogenizer optical system 12 includes, for example, a first multi-lens array 12a and a second multi-lens array 12b. The homogenizer optical system 12 converts the light intensity distribution of the excitation light into a uniform state, so-called top-hat distribution, on a wavelength conversion layer to be described later. The homogenizer optical system 12 superimposes, in conjunction with the first condensing optical system 20, a plurality of small luminous fluxes emitted from a plurality of lenses of the first multi-lens array 12a on each other on the wavelength conversion layer. With this configuration, the light intensity distribution of the excitation light B emitted on the wavelength conversion layer is made into a uniform state.

The first condensing optical system 20 includes, for example, a first lens 20a and a second lens 20b. The first condensing optical system 20 is disposed on the optical path from the homogenizer optical system 12 to the wavelength conversion element 30, and concentrates the excitation light B to cause the excitation light B to be incident on the wavelength conversion layer of the wavelength conversion element 30. In the embodiment, each of the first lens 20a and the second lens 20b is formed of a convex lens.

The second condensing optical system 60 includes, for example, a first collimating lens 62 and a second collimating lens 64. The second condensing optical system 60 substantially collimates light that is emitted from the wavelength conversion element 30. Each of the first collimating lens 62 and the second collimating lens 64 is formed of a convex lens.

The integrator optical system 125 includes, for example, a first lens array 120, a second lens array 130, and a superimposing lens 150. The first lens array 120 includes a plurality of first lenses 122 for dividing light that is emitted from the second condensing optical system 60 into a plurality of partial luminous fluxes. The plurality of first lenses 122 are arranged in a matrix in a plane orthogonal to the illumination optical axis 100ax.

The second lens array 130 includes a plurality of second lenses 132 corresponding to the plurality of first lenses 122 of the first lens array 120. The second lens array 130 forms, in conjunction with the superimposing lens 150, images of the first lenses 122 of the first lens array 120 in the vicinities of the image forming regions of the light modulator 4R, the light modulator 4G, and the light modulator 4B. The plurality of second lenses 132 are arranged in a matrix in a plane orthogonal to the illumination optical axis 100ax.

The polarization conversion element 140 converts light that is emitted from the second lens array 130 to linearly polarized light. The polarization conversion element 140 includes, for example, a polarization separation film and a retardation film (both not shown).

The superimposing lens 150 concentrates the partial luminous fluxes emitted from the polarization conversion element 140 and superimposes the partial luminous fluxes in the vicinities of the image forming regions of the light modulator 4R, the light modulator 4G, and the light modulator 4B. The first lens array 120, the second lens array 130, and the superimposing lens 150 constitute the integrator optical system 125 making the intensity distribution of the light from the wavelength conversion element 30 uniform.

Wavelength Conversion Element

Next, the wavelength conversion element of the embodiment will be described.

Figure 3:
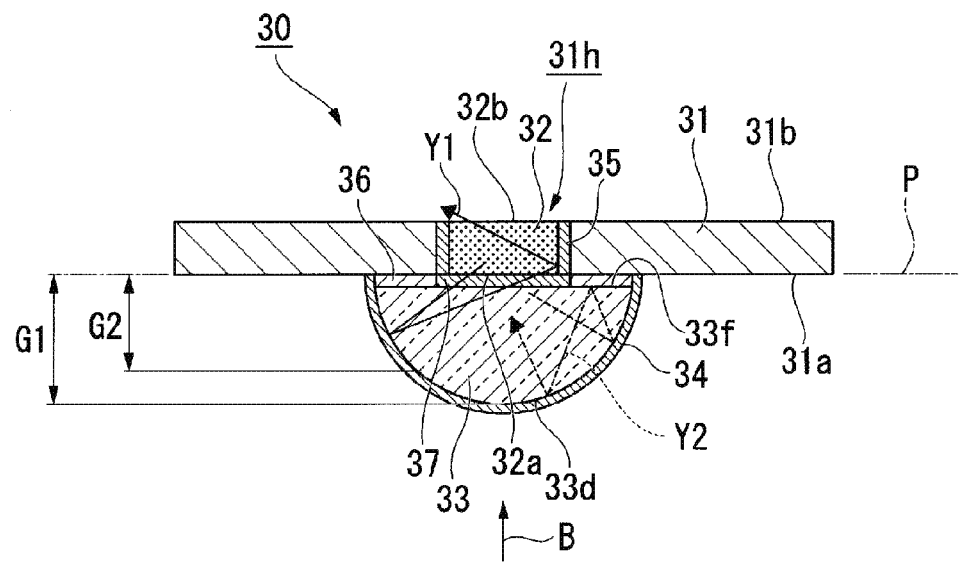
FIG. 3 is a cross-sectional view of a wavelength conversion element of the first embodiment of the invention, cut along a plane including an illumination optical axis.
Figure 4:
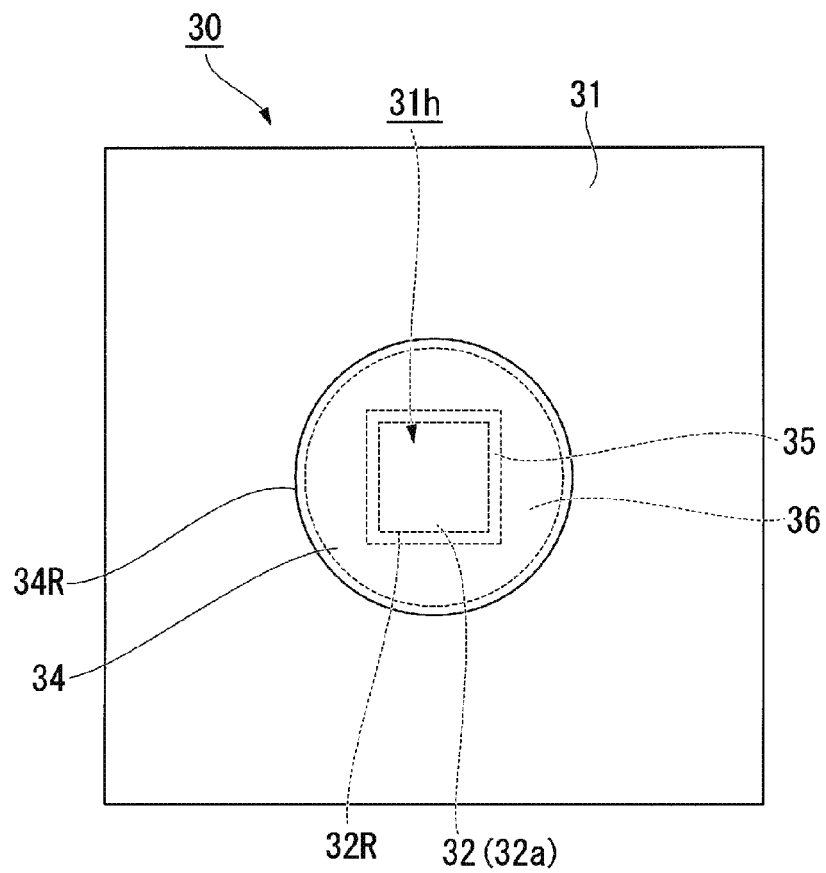
FIG. 4 is a plan view of the wavelength conversion element as viewed from the incident side of excitation light.

FIG. 3 is a cross-sectional view of the wavelength conversion element 30, cut along a plane including the illumination optical axis 100ax in FIG. 2. FIG. 4 is a plan view of the wavelength conversion element 30 as viewed from the incident side of the excitation light B.

As shown in FIGS. 3 and 4, the wavelength conversion element 30 includes a base material 31, the wavelength conversion layer 32, alight-transmissive member 33, a dichroic film 34 that constitutes a first reflection portion, a second reflection film 35, and a third reflection film 36. That is, the embodiment is an example in which the first reflection portion is formed of the dichroic film 34. The second reflection film 35 of the embodiment corresponds to a second reflection portion in the appended claims. The third reflection film 36 of the embodiment corresponds to a third reflection portion in the appended claims. The second condensing optical system 60 corresponds to a collecting optical system in the appended claims.

The base material 31 is formed of a rectangular plate material, and includes a first surface 31a and a second surface 31b that are opposite each other. The second condensing optical system 60 is provided on the second surface 31b side of the base material 31. The base material 31 is provided with a hole 31h that penetrates the base material 31 from the first surface 31a to the second surface 31b. The shape of the hole 31h is rectangular as viewed in a direction perpendicular to the first surface 31a of the base material 31. The base material 31 may be formed of a material having a light-transmissive property, such as glass or quartz, or may be formed of a material not having a light-transmissive property, such as metal. In the case of the metal material, metal that has excellent heat dissipation property, such as aluminum or copper, is desirably used.

The wavelength conversion layer 32 is provided inside the hole 31h of the base material 31. The wavelength conversion layer 32 contains phosphor particles (not shown) that convert the blue excitation light B to yellow fluorescence light Y and emit the yellow fluorescence light Y. The wavelength conversion layer 32 includes a light-incident surface 32a that is substantially flush with the first surface 31a of the base material 31, and a light-exiting surface 32b that is substantially flush with the second surface 31b of the base material 31. Hereinafter, for convenience of description, an imaginary plane including the light-incident surface 32a of the wavelength conversion layer 32 is defined as a reference surface P. As viewed in a direction perpendicular to the reference surface P, the shape of the wavelength conversion layer 32 is a rectangle that reflects the shape of the hole 31h of the base material 31.

As the phosphor particles, for example, yttrium-aluminum-garnet (YAG) based phosphor is used. The forming material of phosphor particles may be of one kind, or a mixture of particles formed using two or more kinds of forming materials may be used. For the wavelength conversion layer 32, a material having excellent heat resistance and surface workability is preferably used. As the wavelength conversion layer 32, for example, a phosphor layer obtained by dispersing the phosphor particles in an inorganic binder such as alumina, or a phosphor layer obtained by sintering the phosphor particles without using a binder is preferably used.

The light-transmissive member 33 is provided on the light-incident surface 32a side of the wavelength conversion layer 32, that is, on the first surface 31a side of the base material 31. The light-transmissive member 33 of the first embodiment is formed of a plano-convex lens made of a material having a light-transmissive property, such as glass, quartz, or sapphire. The light-transmissive member 33 includes a flat surface 33f and a convex surface 33d that corresponds to an inclined portion stated in the appended claims. The flat surface 33f of the light-transmissive member 33 is opposite the light-incident surface 32a of the wavelength conversion layer 32. A heat conduction member 37 having a light-transmissive property is provided between the light-transmissive member 33 and the wavelength conversion layer 32. The light-transmissive member 33 and the wavelength conversion layer 32 are in thermal contact with each other. The third reflection film 36 and a heat transfer member (not shown) are provided between the light-transmissive member 33 and the base material 31. The light-transmissive member 33 and the base material 31 are in thermal contact with each other. As the heat transfer member, grease, adhesive, solder, a heat conduction sheet, or the like is used.

As shown in FIG. 3, the light-transmissive member 33 has a hemispherical shape, and the convex surface 33d of the light-transmissive member 33 has a hemispherical surface shape. That is, the convex surface 33d includes a curved surface. As viewed in the direction perpendicular to the reference surface P, the shape of the light-transmissive member is a circle, and the central portion of the light-transmissive member 33 overlaps the wavelength conversion layer 32. The light-transmissive member 33 is disposed such that the excitation light B passes through the dichroic film 34, to be described later, and the light-incident surface 32a in this order to enter the wavelength conversion layer 32. In the specification, a gap between the reference surface P and the dichroic film 34 in the direction perpendicular to the reference surface P is defined as a distance between the reference surface P and the dichroic film 34. The convex surface 33d is inclined with respect to the light-incident surface 32a such that a distance G2 between the reference surface P and the dichroic film 34 in the periphery region of the dichroic film 34 is smaller than a distance G1 between the reference surface P and the dichroic film 34 in the central region of the dichroic film 34 or in the central region of the wavelength conversion layer 32.

The refractive index of the light-transmissive member 33 is desirably substantially equal to the refractive index of the wavelength conversion layer 32. With the refractive index of the light-transmissive member 33 substantially equal to the refractive index of the wavelength conversion layer 32, the loss of excitation light or fluorescence light due to reflection when the excitation light or fluorescence light passes through the interface between the light-transmissive member 33 and the wavelength conversion layer 32 can be minimized. As a result, a larger amount of fluorescence light can be extracted in a desired direction.

As shown in FIG. 3, the dichroic film 34 is provided on the convex surface 33d of the light-transmissive member 33. The convex surface 33d is a support surface that includes an inclined portion inclined with respect to the light-incident surface 32a and supports the dichroic film 34. That is, the dichroic film 34 is provided along the convex surface 33d, which is the support surface of the light-transmissive member 33. Hence, the dichroic film 34 has a hemispherical surface shape that reflects the shape of the convex surface 33d of the light-transmissive member 33.

As viewed in the direction perpendicular to the reference surface P, the dichroic film 34 is formed in a shape such that the distance between the reference surface P and the dichroic film 34 in the periphery region of the wavelength conversion layer 32 is smaller than the distance G1 between the reference surface P and the dichroic film 34 in the central region of the wavelength conversion layer 32. The dichroic film 34 has the characteristic of transmitting the blue excitation light B emitted from the excitation light source 110 and reflecting the yellow fluorescence light Y produced by the wavelength conversion layer 32.

As shown in FIG. 3, the second reflection film 35 is provided between the base material 31 and the wavelength conversion layer 32. That is, the second reflection film 35 is provided on the inner surface of the hole 31h of the base material 31. The second reflection film 35 reflects the fluorescence light Y produced by the wavelength conversion layer 32. For the second reflection film 35, a metal material having a high optical reflectance, such as aluminum or silver, is desirably used.

The third reflection film 36 is provided between the base material 31 and the light-transmissive member 33. As shown in FIG. 4, an outline 32R of the light-incident surface 32a is located inside an outline 34R of the dichroic film 34 as viewed in the direction perpendicular to the reference surface P. The third reflection film 36 is provided between the outline 32R of the light-incident surface 32a and the outline 34R of the dichroic film 34. The third reflection film 36 reflects a component of the fluorescence light Y toward the dichroic film 34 which component has been reflected by the dichroic film 34 and travels toward a region outside the light-incident surface 32a. For the third reflection film 36, a metal material having a high reflectance, such as aluminum or silver, is desirably used similarly to the second reflection film 35.

In the case where the base material 31 is formed of a material such as aluminum, the second reflection film 35 and the third reflection film 36 may not be necessarily provided because the surface of the base material 31 has light reflectivity.

In a wavelength conversion element in the related art, the dichroic film is provided in a planar shape on the surface of the phosphor layer. Therefore, in fluorescence light that is incident on the dichroic layer, a P-polarization component that is incident on the dichroic film at an incident angle close to Brewster's angle passes through the dichroic layer. Therefore, the wavelength conversion element in the related art has a problem in that the P-polarization component cannot be extracted from a predetermined light-exiting surface.

In contrast, in the wavelength conversion element 30 of the first embodiment, the dichroic film 34 has the hemispherical surface shape reflecting the shape of the convex surface 33d. Therefore, fluorescence light Y1 in FIG. 3, for example, is incident on the dichroic film that is parallel to the reference surface P at an incident angle close to Brewster's angle and passes through the dichroic film in the wavelength conversion element in the related art; while, in the wavelength conversion element 30, the fluorescence light Y1 is incident on the dichroic film 34 at an incident angle smaller than Brewster's angle and is reflected by the dichroic film 34. With this configuration, the proportion of a component of the fluorescence light Y that is not reflected by the dichroic film 34 and is lost can be less than that of the related art. As a result, it is possible to provide a wavelength conversion element in which the proportion of a component of the fluorescence light Y that can be extracted from the light-exiting surface 32b of the wavelength conversion layer 32 in a desired direction is larger than that of the related art.

Further, the wavelength conversion element 30 includes the third reflection film 36; therefore, for example as shown in FIG. 3, fluorescence light Y2 that is reflected by the dichroic film 34 and travels toward the region outside the light-incident surface 32a is reflected by the third reflection film 36, and again reflected by the dichroic film toward the light-incident surface 32a. With this configuration, the proportion of the component of the fluorescence light Y that can be extracted in the desired direction can be further increased.

The second reflection film 35 reflects a component that is directly incident from the wavelength conversion layer 32 and a component that is reflected by the dichroic film 34. The third reflection film 36 reflects the component that is reflected by the dichroic film 34 and travels toward the region outside the light-incident surface 32a. With this configuration, the area of a region where the fluorescence light Y is emitted from the wavelength conversion element 30 to the second surface 31b side does not become larger than the area of the light-exiting surface 32b. That is, an increase in etendue is suppressed in the wavelength conversion element 30. With this configuration, a light source device with high light-use efficiency can be realized.

Moreover, since the light-transmissive member 33 and the wavelength conversion layer 32 are in thermal contact with each other through the heat transfer member, the heat generated in the wavelength conversion layer 32 can be dissipated by conducting the heat not only to the base material 31 but also to the light-transmissive member 33.

Second Embodiment

Hereinafter, a second embodiment of the invention will be described with reference to FIG. 5.

The basic configurations of a projector and a light source device according to the second embodiment are similar to those of the first embodiment, but the configuration of a wavelength conversion element is different from that of the first embodiment. Therefore, a general description of the projector and the light source device is omitted, and only the wavelength conversion element will be described.

Figure 5:
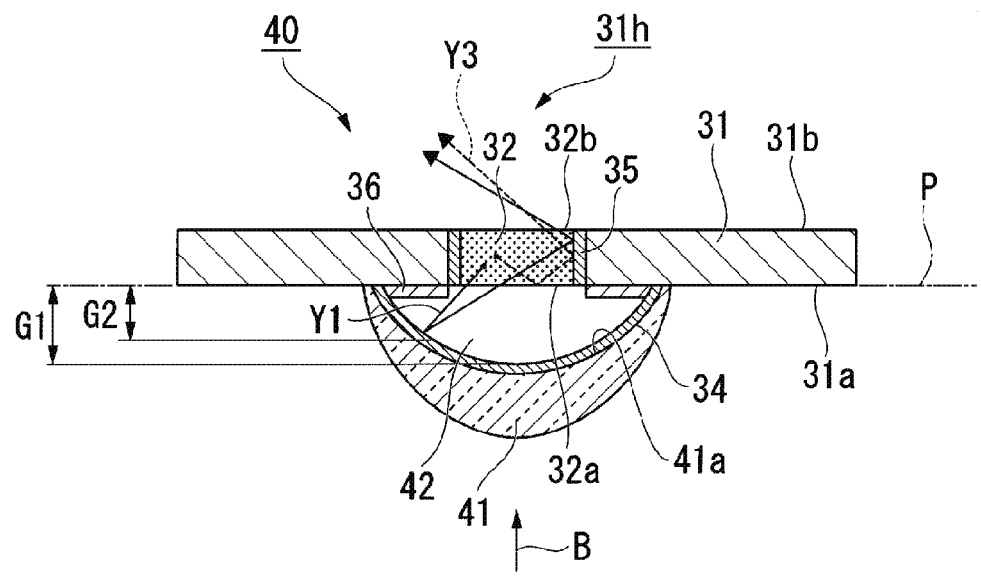
FIG. 5 is a cross-sectional view of a wavelength conversion element of a second embodiment of the invention.

FIG. 5 is a cross-sectional view of the wavelength conversion element of the second embodiment. FIG. 5 corresponds to FIG. 3 in the first embodiment.

In FIG. 5, components common to those in FIG. 3 are denoted by the same reference numerals and signs, and a description is omitted.

In the wavelength conversion element of the first embodiment, a plano-convex lens is used as the light-transmissive member. In contrast, in the wavelength conversion element 40 of the second embodiment as shown in FIG. 5, a convex meniscus lens is used as a light-transmissive member 41.

Hereinafter, a concave surface of the convex meniscus lens constituting the light-transmissive member 41 is referred to as "first curved surface 41a". The first curved surface 41a corresponds to the inclined portion stated in the appended claims.

The light-transmissive member 41 is provided such that the first curved surface 41a is opposite the light-incident surface 32a of the wavelength conversion layer 32. Therefore, an air layer 42 is provided between the light-transmissive member 41 and the light-incident surface 32a of the wavelength conversion layer 32.

The dichroic film 34 is provided on the first curved surface 41a of the light-transmissive member 41. The first curved surface 41a functions as a support surface of the dichroic film 34. Hence, the dichroic film 34 has a shape that reflects the shape of the first curved surface 41a of the light-transmissive member 41. The first curved surface 41a is inclined with respect to the light-incident surface 32a such that the distance G2 between the reference surface P and the dichroic film 34 in the periphery region of the dichroic film 34 is smaller than the distance G1 between the reference surface P and the dichroic film 34 in the central region of the dichroic film 34. Further, in the dichroic film 34, a distance between the reference surface P and the dichroic film 34 in the periphery region of the wavelength conversion layer 32 is smaller than the distance G1 between the reference surface P and the dichroic film 34 in the central region of the wavelength conversion layer 32. Other configurations are similar to those of the first embodiment.

Also in the second embodiment, an advantageous effect is obtained in which it is possible to provide a wavelength conversion element in which the proportion of a component of the fluorescence light Y that can be extracted from the light-exiting surface 32b of the wavelength conversion layer 32 in a desired direction is larger than that of the related art, similarly to the first embodiment.

Especially in the case of the second embodiment, the air layer 42 is present between the light-incident surface 32a of the wavelength conversion layer 32 and the light-transmissive member 41. Therefore, in the fluorescence light Y produced by the wavelength conversion layer 32, a component that is totally reflected by the light-incident surface 32a, like fluorescence light Y3 in FIG. 5 for example, is increased compared with the case where the air layer is not present. Moreover, the fluorescence light Y that is emitted from the wavelength conversion layer 32 toward the dichroic film 34 is incident on the dichroic film 34 without passing through the light-transmissive member 41. With this configuration, it is possible to suppress the loss of the fluorescence light Y due to absorption within the light-transmissive member 41. With these configurations, in the fluorescence light Y produced by the wavelength conversion layer, the component that can be extracted from the light-exiting surface 32b of the wavelength conversion layer 32 in a desired direction can be further increased.

Third Embodiment

Hereinafter, a third embodiment of the invention will be described with reference to FIG. 6.

The basic configurations of a projector and a light source device according to the third embodiment are similar to those of the first embodiment, but the configuration of a wavelength conversion element is different from that of the first embodiment. Therefore, a general description of the projector and the light source device is omitted, and only the wavelength conversion element will be described.

Figure 6:
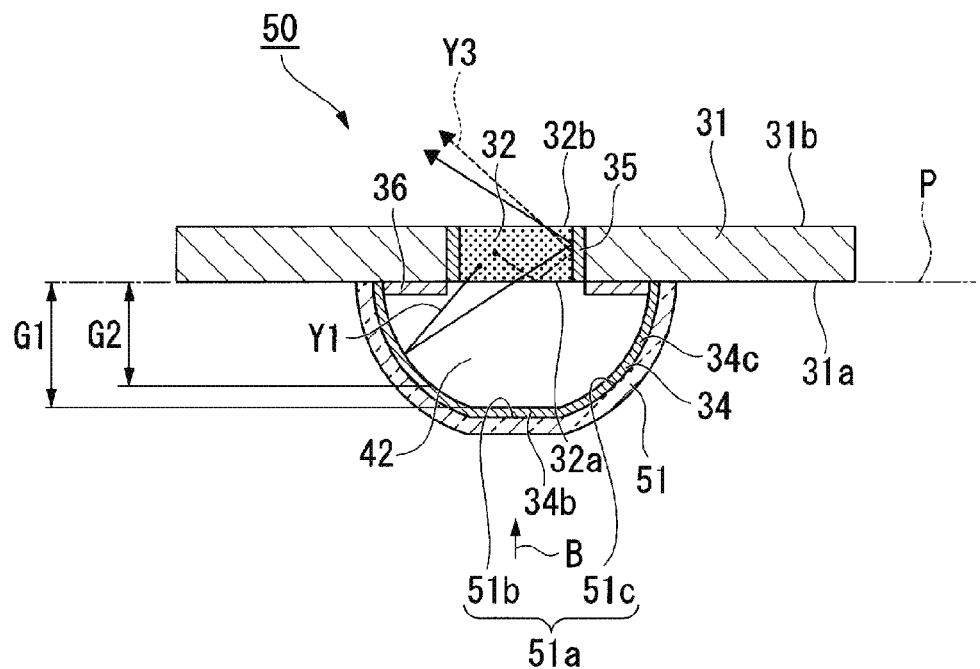
FIG. 6 is a cross-sectional view of a wavelength conversion element of a third embodiment of the invention.

FIG. 6 is a cross-sectional view of the wavelength conversion element of the third embodiment. FIG. 6 corresponds to FIG. 3 in the first embodiment.

In FIG. 6, components common to those in FIG. 3 are denoted by the same reference numerals and signs, and a description is omitted.

As shown in FIG. 6, the wavelength conversion element 50 of the third embodiment includes a shell-like light-transmissive member 51. The light-transmissive member 51 includes a first surface 51a that is a concave surface, and a convex surface. The first surface 51a has a substantially hemispherical shape. Specifically, the first surface 51a includes a flat surface 51b at the central portion and a curved surface portion 51c forming a portion of a spherical surface at the periphery portion. The curved surface portion 51c corresponds to the inclined portion stated in the appended claims. The curvature of the curved surface portion 51c of the first surface 51a and the curvature of a curved surface portion of the convex surface may be equal or may not be equal to each other. The light-transmissive member 51 does not have to have a lens shape as in the embodiment.

The light-transmissive member 51 is provided such that the first surface 51a is opposite the light-incident surface 32a of the wavelength conversion layer 32. Therefore, the air layer 42 is provided between the light-transmissive member 51 and the light-incident surface 32a of the wavelength conversion layer 32.

The dichroic film 34 is provided on the first surface 51a of the light-transmissive member 51. The first surface 51a functions as a support surface of the dichroic film 34. Hence, the dichroic film 34 reflects the shape of the first surface 51a of the light-transmissive member 51, includes a flat portion 34b in the central region, and includes an inclined portion 34c (curved surface portion) in the periphery region. The curved surface portion 51c is inclined with respect to the light-incident surface 32a such that the distance G2 between the reference surface P and the dichroic film 34 in the periphery region of the dichroic film 34 is smaller than the distance G1 between the reference surface P and the dichroic film 34 in the central region of the dichroic film 34. Further, a distance between the reference surface P and the dichroic film 34 in the periphery region of the wavelength conversion layer 32 is smaller than the distance G1 between the reference surface P and the dichroic film 34 in the central region of the wavelength conversion layer 32. Other configurations are similar to those of the first embodiment.

Also in the third embodiment, an advantageous effect is obtained in which it is possible to provide a wavelength conversion element in which the proportion of a component of the fluorescence light Y that can be extracted from the light-exiting surface 32b of the wavelength conversion layer 32 in a desired direction is larger than that of the related art, similarly to the first and second embodiments.

Moreover, the fluorescence light Y that is emitted from the wavelength conversion layer 32 toward the dichroic film 34 is incident on the dichroic film 34 without passing through the light-transmissive member 51. Therefore, an advantageous effect is obtained in which the component that can be extracted in a desired direction can be further increased, similarly to the second embodiment.

Moreover, in the case of the third embodiment, since the light-transmissive member 51 includes the flat portion 51b in the central region, the light-transmissive member 51 can be stably placed and thus workability in fixing the light-transmissive member 51 onto the base material 31 is improved. Further, forming the dichroic film on a flat surface is easier than forming the dichroic film on a curved surface. Therefore, compared with the case where the light-transmissive member 51 does not include the flat portion 51b, the optical characteristic of the entire dichroic film 34 is high.

Fourth Embodiment

Hereinafter, a fourth embodiment of the invention will be described with reference to FIG. 7.

The basic configurations of a projector and a light source device according to the fourth embodiment are similar to those of the first embodiment, but the configuration of a wavelength conversion element is different from that of the first embodiment. Therefore, a general description of the projector and the light source device is omitted, and only the wavelength conversion element will be described.

Figure 7:
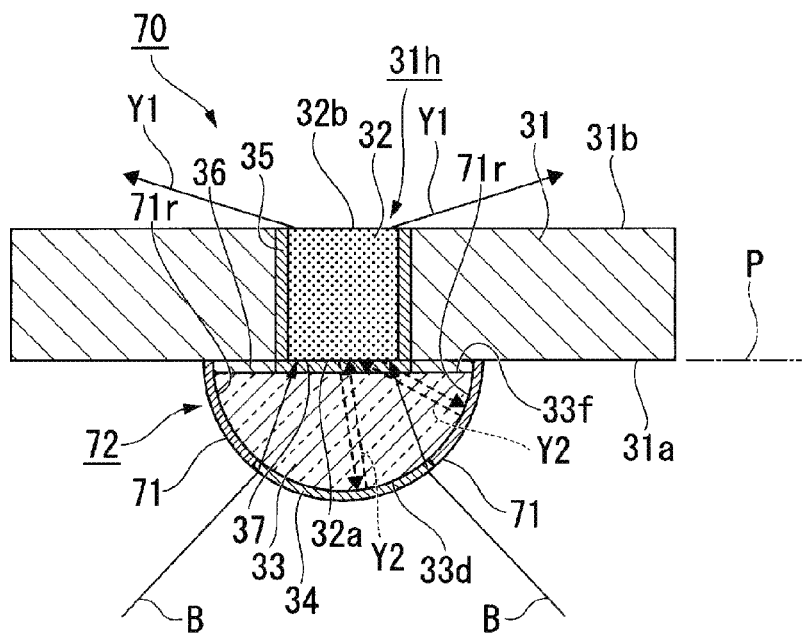
FIG. 7 is a cross-sectional view of a wavelength conversion element of a fourth embodiment of the invention.

FIG. 7 is a cross-sectional view of the wavelength conversion element of the fourth embodiment. FIG. 7 corresponds to FIG. 3 in the first embodiment.

In FIG. 7, components common to those in FIG. 3 are denoted by the same reference numerals and signs, and a description is omitted.

In the wavelength conversion elements of the first to third embodiments, the first reflection portion is formed only of the dichroic film 34. In contrast, in the wavelength conversion element of the fourth embodiment and wavelength conversion elements of fifth and sixth embodiments, the first reflection portion is formed of the dichroic film 34 and a reflection surface 71r. Moreover, in the fourth embodiment, the reflection surface 71r is formed of a first reflection film 71 made of a metal material.

As shown in FIG. 7, the wavelength conversion element 70 of the fourth embodiment includes the base material 31, the wavelength conversion layer 32, the light-transmissive member 33, a first reflection portion 72 including the dichroic film 34 and the first reflection film 71, the second reflection film 35, and the third reflection film 36. That is, the first reflection portion 72 further includes a reflection surface made of a metal material.

As viewed in the direction perpendicular to the reference surface P, the dichroic film 34 is provided in a region including the central region of the wavelength conversion layer 32, and the first reflection film 71 is provided outside the dichroic film 34. The first reflection film 71 is formed of the metal material provided on the convex surface 33d of the light-transmissive member 33. The convex surface 33d (support surface) of the light-transmissive member 33 has a hemispherical shape and includes a curved surface. A metal material having high optical reflectance, such as aluminum or silver, is desirably used for the first reflection film 71.

Other configurations are similar to those of the first embodiment.

It is sufficient that the first reflection film 71 includes a portion provided at least outside the dichroic film 34, and the first reflection film 71 may partially overlap the dichroic film 34.

The dichroic film 34 transmits the blue excitation light B emitted from the excitation light source 110 and reflects the yellow fluorescence light Y produced by the wavelength conversion layer 32. The first reflection film 71 reflects the yellow fluorescence light Y produced by the wavelength conversion layer 32. That is, in the first reflection portion 72, the dichroic film 34 has wavelength selectivity while the first reflection film 71 does not have wavelength selectivity.

As viewed in the direction perpendicular to the reference surface P, the shape of the forming region of the dichroic film 34 is not particularly limited but is desirably matched to the shape of the irradiation region of the excitation light B. Moreover, the dimensions of the forming region of the dichroic film 34 are not particularly limited but are desirably set appropriately to the size of the irradiation region of the excitation light B. For example, the forming region of the dichroic film 34 is desirably set to be slightly larger than the irradiation region of the excitation light B. With this configuration, even if the irradiation position of the excitation light B is somewhat shifted from the original position on the dichroic film 34, the loss of the excitation light B can be minimized.

Also in the fourth embodiment, an advantageous effect is obtained in which it is possible to provide a wavelength conversion element in which the proportion of a component of the fluorescence light Y that can be extracted from the light-exiting surface 32b of the wavelength conversion layer 32 in a desired direction is larger than that of the related art, similarly to the first to third embodiments.

The dichroic film has the incident angle dependence of reflectance, whereas the reflection surface made of a metal material does not have the incident angle dependence of reflectance. Therefore, if the first reflection portion 72 is formed only of the dichroic film, the fluorescence light passes through the dichroic film depending on the incident angle and thus the efficiency in extracting the fluorescence light from the light-exiting surface 32b decreases. In that regard, since the first reflection film 71 is provided outside the dichroic film 34 in the wavelength conversion element 70 of the fourth embodiment, the fluorescence light Y2 emitted from the wavelength conversion layer 32 toward the region outside the dichroic film 34 is efficiently reflected by the reflection surface 71r. With this configuration, the efficiency in extracting the fluorescence light Y2 from the light-exiting surface 32b can be increased.

Fifth Embodiment

Hereinafter, a fifth embodiment of the invention will be described with reference to FIG. 8.

The basic configurations of a projector and a light source device according to the fifth embodiment are similar to those of the first embodiment, but the configuration of the wavelength conversion element is different from that of the first embodiment. Therefore, a general description of the projector and the light source device is omitted, and only the wavelength conversion element will be described.

Figure 8:
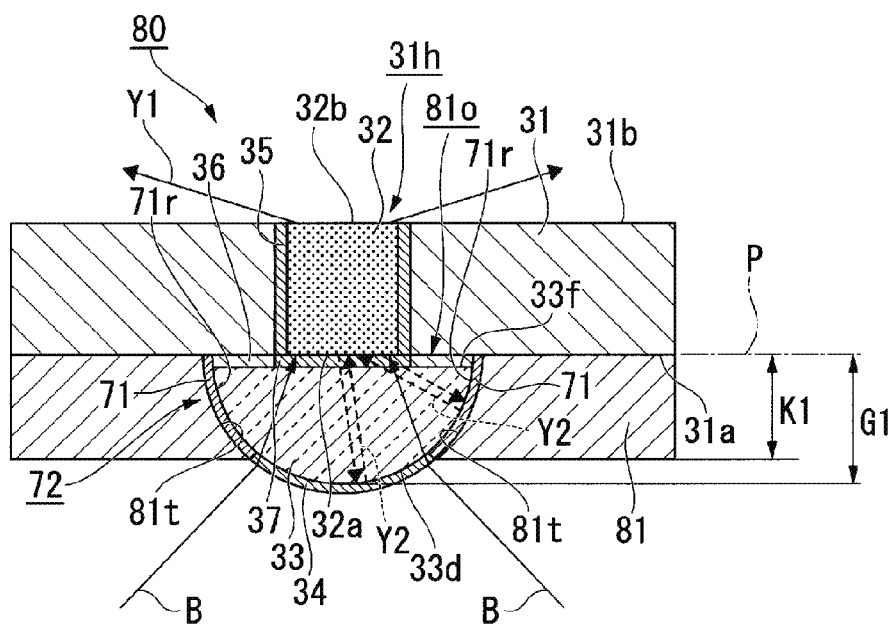
FIG. 8 is a cross-sectional view of a wavelength conversion element of a fifth embodiment of the invention.

FIG. 8 is a cross-sectional view of the wavelength conversion element of the fifth embodiment. FIG. 8 corresponds to FIG. 3 in the first embodiment.

In FIG. 8, components common to those in FIG. 3 are denoted by the same reference numerals and signs, and a description is omitted.

As shown in FIG. 8, the wavelength conversion element 80 of the fifth embodiment includes the base material 31, the wavelength conversion layer 32, the light-transmissive member 33, a structure 81, the first reflection portion 72 including the dichroic film 34 and the reflection surface 71r, the second reflection film 35, and the third reflection film 36.

Similarly to the fourth embodiment, the dichroic film 34 is provided in the region including the central region of the wavelength conversion layer 32, and the reflection surface 71r is provided outside the dichroic film 34, as viewed in the direction perpendicular to the reference surface P. Further, the wavelength conversion element 80 includes the structure 81 overlapping the reflection surface 71r as viewed in the direction perpendicular to the reference surface P.

The structure 81 is a plate-like member and includes, for example, a circular opening 81o in the central region as viewed in the direction perpendicular to the reference surface P. A thickness K1 of the structure 81 is smaller than the distance G1 between the reference surface P and the dichroic film 34 in the central region of the dichroic film 34. The light-transmissive member 33 is fitted into the opening 81o of the structure 81, and the central region of the light-transmissive member 33 is exposed through the opening 81o of the structure 81. The constituent material of the structure 81 is not particularly limited, but, for example, an inorganic material or a metal material is used.

The convex surface 33d (support surface) is provided on the side of the light-transmissive member 33 opposite to the light-incident surface 32a. In the first reflection portion 72, the dichroic film 34 is provided on the convex surface 33d of the light-transmissive member 33. The reflection surface 71r is formed of the first reflection film 71 provided on the structure 81. The first reflection film 71 is provided on a surface 81t of the structure 81 on the opening 81o side. The structure 81 is in contact with the light-transmissive member 33 through the first reflection film 71.

Other configurations are similar to those of the fourth embodiment.

Also in the fifth embodiment, an advantageous effect is obtained in which it is possible to provide a wavelength conversion element in which the proportion of a component of the fluorescence light Y that can be extracted from the light-exiting surface 32b of the wavelength conversion layer 32 in a desired direction is larger than that of the related art, similarly to the first to fourth embodiments.

In the case of the fifth embodiment, the light-transmissive member 33 and the structure 81 are thermally connected through the first reflection film 71. Therefore, the heat generated in the wavelength conversion layer 32 in irradiation with the excitation light B is released to the outside through the light-transmissive member 33, the first reflection film 71, and the structure 81. The heat dissipation of the wavelength conversion layer 32 is promoted in this manner, so that the conversion efficiency of the wavelength conversion layer 32 can be increased. For promoting the heat dissipation of the wavelength conversion layer 32, the structure 81 is desirably formed of a material having a high thermal conductivity.

In the case of the wavelength conversion element 70 of the fourth embodiment, the dichroic film 34 is provided on a portion of the convex surface 33d of the light-transmissive member 33, and the first reflection film 71 is provided on another portion of the convex surface 33d. Therefore, each of the dichroic film 34 and the first reflection film 71 has to be selectively deposited in the manufacture of the wavelength conversion element 70, which requires masking in the deposition step.

In contrast, in the case of the fifth embodiment, the dichroic film 34 is provided on the light-transmissive member 33, and the first reflection film 71 is provided on the structure 81. Therefore, it is possible to employ a deposition process in which, for example, after the first reflection film 71 is deposited on the structure 81, the light-transmissive member 33 is fitted into the opening 81o, and then the dichroic film 34 is deposited on the light-transmissive member 33. According to this deposition process, the structure 81 functions as a mask, so that the dichroic film 34 is selectively deposited on the central region of the light-transmissive member 33 exposed from the structure 81. Therefore, masking is not required, and thus the deposition process is simplified.

Sixth Embodiment

Hereinafter, a sixth embodiment of the invention will be described with reference to FIG. 9.

The basic configurations of a projector and a light source device according to the sixth embodiment are similar to those of the first embodiment, but the configuration of the wavelength conversion element is different from that of the first embodiment. Therefore, a general description of the projector and the light source device is omitted, and only the wavelength conversion element will be described.

Figure 9:
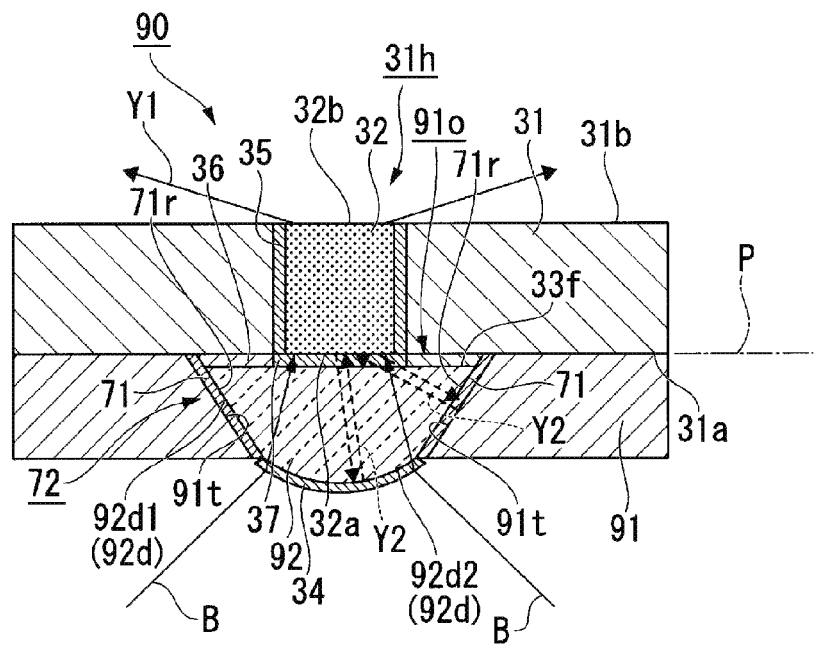
FIG. 9 is a cross-sectional view of a wavelength conversion element of a sixth embodiment of the invention.

FIG. 9 is a cross-sectional view of the wavelength conversion element of the sixth embodiment. FIG. 9 corresponds to FIG. 3 in the first embodiment.

In FIG. 9, components common to those in FIG. 3 are denoted by the same reference numerals and signs, and a description is omitted.

In the wavelength conversion element 80 of the fifth embodiment, the surface 81*t* of the structure 81 on the opening 81*o* side has a curved shape in cross-section, in a cross-section perpendicular to the reference surface P. In contrast, in the wavelength conversion element 90 of the sixth embodiment as shown in FIG. 9, a surface 91*t* of a structure 91 on an opening 910 side has a linear shape in cross-section, in a cross-section perpendicular to the reference surface P. Therefore, in a convex surface 92*d*, a region 92*d*1 that is in contact with the surface 91*t* of the structure 91 has a linear shape in cross-section while a region 92*d*2 that is exposed through the opening 910 of the structure 91 has a curved shape in cross-section, in the cross-section perpendicular to the reference surface P.

Other configurations are similar to those of the fifth embodiment.

Also in the sixth embodiment, an advantageous effect is obtained in which it is possible to provide a wavelength conversion element in which the proportion of a component of the fluorescence light Y that can be extracted from the light-exiting surface 32*b* of the wavelength conversion layer 32 in a desired direction is larger than that of the related art, similarly to the first to fifth embodiments. Moreover, also in the sixth embodiment, an advantageous effect is obtained in which the deposition process is simplified, similarly to the fifth embodiment.

Seventh Embodiment

Hereinafter, a seventh embodiment of the invention will be described with reference to FIG. 10.

The basic configurations of a projector and a light source device according to the seventh embodiment are similar to those of the first embodiment, but the configuration of a wavelength conversion element is different from that of the first embodiment. Therefore, a general description of the projector and the light source device is omitted, and only the wavelength conversion element will be described.

Figure 10:
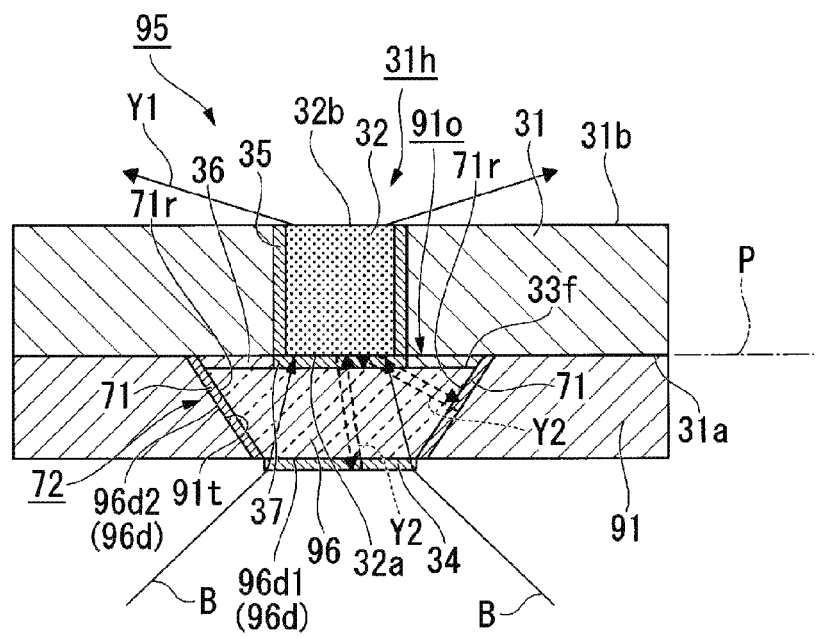
FIG. 10 is a cross-sectional view of a wavelength conversion element of a seventh embodiment of the invention.

FIG. 10 is a cross-sectional view of the wavelength conversion element of the seventh embodiment. FIG. 10 corresponds to FIG. 9 in the sixth embodiment.

In FIG. 10, components common to those in FIG. 9 are denoted by the same reference numerals and signs, and a description is omitted.

In the wavelength conversion element 90 of the sixth embodiment, the convex surface 92*d*2 of a light-transmissive member 92, which is exposed through the opening 910 of the structure 91, has a curved surface shape. In contrast, in the wavelength conversion element 95 of the seventh embodiment as shown in FIG. 10, a convex surface 96*d* (support surface) of a light-transmissive member 96 includes a flat surface 96*d*1 and an inclined surface 96*d*2 corresponding to the inclined portion stated in the appended claims. That is, the light-transmissive member 96 of the seventh embodiment exhibits a shape obtained by cutting off the portion exposed through the opening of the structure 91 in the light-transmissive member 92 of the sixth embodiment along the flat surface. As described above, the dichroic film 34 may not necessarily be provided on the inclined portion, and may be provided on the flat surface 96*d*1.

Other configurations are similar to those of the sixth embodiment.

Also in the seventh embodiment, an advantageous effect is obtained in which it is possible to provide a wavelength conversion element in which the proportion of a component of the fluorescence light Y that can be extracted from the light-exiting surface 32*b* of the wavelength conversion layer 32 in a desired direction is larger than that of the related art, similarly to the first to sixth embodiments. Moreover, also in the seventh embodiment, an advantageous effect is obtained in which the deposition process is simplified, similarly to the fifth embodiment.

In the fifth to seventh embodiments, an example in which the dichroic film 34 and the first reflection film 71 are provided on the light-transmissive member and the structure, respectively, for simplifying the deposition process has been presented. However, if the deposition process is not required to be simplified, both the dichroic film 34 and the first reflection film 71 may be provided on the light-transmissive member as in the fourth embodiment. Even in that case, an advantageous effect in which the heat dissipation effect is increased is obtained when the light-transmissive member and the structure are thermally connected through the first reflection film 71. Moreover, the light-transmissive member and the structure may not necessarily be in contact with each other, and the air layer may be provided between the light-transmissive member and the structure.

The technical scope of the invention is not limited to the embodiments, and various modifications can be added within the scope not departing from the gist of the invention.

For example, as the light-transmissive member, the plano-convex lens is used in the first embodiment while the convex meniscus lens is used in the second embodiment; however, a plano-concave lens or a concave meniscus lens, for example, may be used other than the plano-convex lens and the convex meniscus lens. Moreover, a light-transmissive member having a shape other than a lens may be used as in the third embodiment and the seventh embodiment.

In the embodiments, an example in which the light-transmissive member is in contact with the base material has been shown; however, the light-transmissive member may be disposed apart from the base material. In that case, the light-transmissive member may be supported by any support portion. Moreover, in the first to sixth embodiments, an example in which the light-transmissive member includes a curved surface at at least a portion thereof and the dichroic film is provided on the curved surface has been shown; however, the light-transmissive member may not necessarily include the curved surface. For example, the light-transmissive member may include a plane (inclined portion) inclined with respect to the reference surface P including the light-incident surface of the wavelength conversion layer, and the dichroic film may be provided on the plane. Moreover, in the wavelength conversion element according to the invention, the base material is not essential and may not be present. For example, in the case where the light-transmissive member is formed of a plano-convex lens, the wavelength conversion layer may be supported by a flat surface of the plano-convex lens. Moreover, a dichroic film that reflects the excitation light B and transmits the fluorescence light Y may be provided on the light-exiting surface 32*b* of the wavelength conversion layer 32.

In addition, the number, shape, material, arrangement, and the like of the components constituting each of the wavelength conversion element and the light source device can be appropriately changed. Moreover, although the projector including three light modulators has been exemplified in the embodiments, the invention can be applied to a projector that displays a color video using one light modulator. Further, the light modulator is not limited to the liquid crystal panel described above, but, for example, a digital mirror device or the like can also be used.

In addition, the shape, number, arrangement, material, and the like of the components of the projector are not limited to those of the embodiments but can be appropriately changed.

Moreover, although an example in which the light source device according to the invention is mounted in the projector has been shown in the embodiment, the invention is not limited to this. The light source device according to the invention can also be applied to a luminaire, an automobile headlight, and the like.

The entire disclosure of Japanese Patent Application No.: 2016-020587, filed on Feb. 5, 2016 and 2016-143503, filed on Jul. 21, 2016 are expressly incorporated by reference herein.

What is claimed is:

1. A wavelength conversion element comprising:
   a wavelength conversion layer including a light-incident surface;
   a light-transmissive member provided on the light-incident surface side of the wavelength conversion layer and including a support surface including an inclined portion inclined with respect to the light-incident surface; and
   a first reflection portion provided along the support surface and reflecting fluorescence light emitted from the wavelength conversion layer, wherein
   at least a portion of the first reflection portion is formed of a dichroic film that transmits excitation light for exciting the wavelength conversion layer,
   the light-transmissive member is disposed such that the excitation light passes through the dichroic film and the light-incident surface in this order to enter the wavelength conversion layer, and
   when a plane including the light-incident surface is defined as a reference surface and a gap between the reference surface and the first reflection portion in a direction perpendicular to the reference surface is defined as a distance between the reference surface and the first reflection portion, the inclined portion is inclined with respect to the light-incident surface such that a distance between the reference surface and the first reflection portion in a periphery region of the first reflection portion is smaller than a distance between the reference surface and the first reflection portion in a central region of the first reflection portion.

2. The wavelength conversion element according to claim 1, wherein
   an air layer is provided between the light-transmissive member and the light-incident surface.

3. The wavelength conversion element according to claim 1, wherein
   the support surface includes a flat surface.

4. The wavelength conversion element according to claim 1, wherein
   the support surface includes a curved surface.

5. The wavelength conversion element according to claim 1, wherein
   the light-transmissive member is a plano-convex lens,
   a flat surface of the plano-convex lens is opposite the light-incident surface, and
   the flat surface is in thermal contact with the light-incident surface.

6. The wavelength conversion element according to claim 5, wherein
   a refractive index of the light-transmissive member is substantially equal to a refractive index of a phosphor constituting the wavelength conversion layer.

7. The wavelength conversion element according to claim 1, wherein
   the first reflection portion further includes a reflection surface made of a metal material, and
   as viewed in a direction perpendicular to the light-incident surface, the dichroic film is provided in a region including the central region of the wavelength conversion layer and the reflection surface is provided at least outside the dichroic film.

8. The wavelength conversion element according to claim 7, further comprising a structure overlapping the reflection surface as viewed in the direction perpendicular to the light-incident surface, wherein
   the support surface is provided on the side of the light-transmissive member opposite to the light-incident surface, and
   the reflection surface is provided on the structure.

9. The wavelength conversion element according to claim 8, wherein
   the reflection surface is formed of a reflection film provided on the structure.

10. The wavelength conversion element according to claim 1, wherein
    the support surface is provided on the light-incident surface side of the light-transmissive member.

11. A light source device comprising:
    the wavelength conversion element according to claim 1; and
    an excitation light source that emits the excitation light.

12. A light source device comprising:
    the wavelength conversion element according to claim 2; and
    an excitation light source that emits the excitation light.

13. A light source device comprising:
    the wavelength conversion element according to claim 3; and
    an excitation light source that emits the excitation light.

14. A light source device comprising:
    the wavelength conversion element according to claim 4; and
    an excitation light source that emits the excitation light.

15. A light source device comprising:
    the wavelength conversion element according to claim 5; and
    an excitation light source that emits the excitation light.

16. The light source device according to claim 11, further comprising:
    a base material including a first surface and a second surface opposite the first surface;
    a collecting optical system; and
    a second reflection portion, wherein
    the base material includes a hole penetrating the base material from the first surface to the second surface,
    the wavelength conversion layer is provided in the hole,
    the light-transmissive member is provided on the first surface side of the base material,
    the collecting optical system is provided on the second surface side of the base material, and
    the second reflection portion is provided between the base material and the wavelength conversion layer.

17. The light source device according to claim 16, wherein an outline of the light-incident surface is located inside an outline of the dichroic film as viewed in a direction perpendicular to the plane, and the light source device further comprises a third reflection portion reflecting a component of the fluorescence light toward the dichroic film, the component having been reflected by the dichroic film and traveling toward a region outside the light-incident surface.

18. A projector comprising:
the light source device according to claim 11;
a light modulator that modulates, in accordance with image information, light emitted from the light source device to produce image light; and
a projection optical system that projects the image light.

19. A projector comprising:
the light source device according to claim 16;
a light modulator that modulates, in accordance with image information, light emitted from the light source device to produce image light; and
a projection optical system that projects the image light.

20. A projector comprising:
the light source device according to claim 17;
a light modulator that modulates, in accordance with image information, light emitted from the light source device to produce image light; and
a projection optical system that projects the image light.

* * * * *